June 9, 1931.　　　O. R. BRINEY　　　1,809,547
GAUGE DEVICE
Filed Feb. 7, 1928
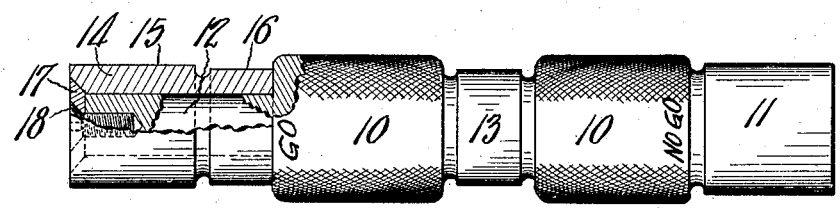
Inventor
O. R. Briney
C. F. Heinkel,　Attorney Patented June 9, 1931

1,809,547

UNITED STATES PATENT OFFICE

OTTIS R. BRINEY, OF PONTIAC, MICHIGAN

GAUGE DEVICE

Application filed February 7, 1928. Serial No. 252,546.

My invention relates to gauge devices generally and to plug gauge devices particularly.

One object of my invention is a gauge device which carries a means for checking the size of one or more of the gauging members of the device while the device is in use to eliminate the necessity of periodically returning the device to a checking station as well as to eliminate the possibility of spoiled work through excessively worn gauging members in that the gauging members check themselves either by the work gauged or by an extraneous instrument which an operator or user can use or apply while his machine does not require his entire attention or while the device is in use otherwise. A further object of my invention is to make gauging and checking members renewable so that the entire device needs not to be discarded when one or more of the members become worn below allowable limits. A further object of my invention is to make gauging members and the corresponding checking members of one piece structure so that these corresponding members are always in alignment with each other and can be placed adjacent to each other to eliminate the necessity of spacing them far enough from each other to avoid that an eccentricity of one member affects the gauging or the checking property of the other. Other objects will appear, or become apparent or obvious, or will suggest themselves, during the description of the device shown in the accompanying drawing in which:—

The single figure is a side view, partly in section, of a plug gauge device embodying the features of my invention.

The device shown in the drawing has the handle portion 10 substantially in the longitudinal middle thereof, the "NO GO" gauging portion or member 11 at one end of the device adjacent to one end of the handle portion, the diametrically reduced portion or member 12 at the other end of the device adjacent to the other end of the handle portion, and the checking portion or member 13 substantially in the middle of the handle portion longitudinally.

The device also has the renewable one piece element 14 extendable over and removable from the portion 12, is composed of the "GO" gauging portion 15 and the checking portion 16, and is held on the portion 12 longitudinally by means of the washer 17 and the screw 18 threaded into the end of the portion 12.

In most instances, in devices under consideration, the differences in size between the "GO" and the check members is rather small. When the "GO" and check members are made separate and are mounted side by side, it is quite impractical to have both of them in exact alignment resulting in eccentricity between them. When any eccentricity is present between them, the "GO" member would enter a hole before it has worn down to the low allowable limit or size and the check member would not enter the hole since it is eccentric with the "GO" member and forms an eccentric shoulder which prevents the check member from entering the hole and thereby causes the user to assume that the "GO" member has worn below the allowable limit although it really is not worn below that limit.

The separate mounting of the "GO" and check members would require a prohibitive amount of expense to mount them in alignment and to keep them in alignment if it can be accomplished at all. The one piece structure of the "GO" and check members requires no close fitting since the element 14 can fit loosely on the element 12 without danger of affecting the alignment of the members thereof and a one piece structure will always retain the members thereof in alignment.

In many instances, as in my Patent No. 1,514,250, for instance, the "GO" and the "NO GO" gauging members are on one end of the handle. This is a disadvantage in some instances since a blind bottom hole or other obstruction, such as a chuck or a collet bottom, would prevent the "NO GO" gauging member from reaching the hole to be gauged so that such a gauge device would be useless in many instances.

To avoid this disadvantage, I, as a feature of my invention, place the "NO GO" gauging member on one end of the handle and the "GO" gauging member on the other end.

The device is first made with the checking members 13 and 16 of a size equal to the smallest permissible limit of the size of a hole; the "GO" member 15 of a size a little larger than the smallest permissible limit the difference being the amount of wear of the "GO" member; and the "NO GO" member 11 of a size equal to a size which would make the hole too large.

As an illustration of relative sizes for gauging and checking members, it is supposed that a number of holes, 1 inch in diameter, are to be bored and that the smallest permissible diameter is 0.995 inch and the largest permissible diameter is 1.001 inches. In such a case, the "NO GO" gauging member may be made 1.0011 inches, the "GO" gauging member 0.996, and the checking member 0.995 inch.

In this instance, the "GO" gauging member can wear from a diameter of 0.996 inch down to a diameter of 0.995 inch or a 0.001 inch before the checking member begins to come into play in the holes.

As long as the "GO" gauging member and the checking member enter the hole and the "NO GO" gauging member does not, the hole is considered to be within permissible limits. When the "NO GO" gauging member also enters the hole, the hole is 1.0011 inches or larger and therefore larger than the permissible size of 1.001 inches.

When an operator or user uses this device for gauging holes for instance, the holes gauged will be of permissible size when the "GO" member 15 and the checking member 16 enters the holes and the "NO GO" member does not enter the holes. During use, the "GO" member wears and, eventually, wears below allowable limits. Now when, after some use, the operator finds that the "GO" member 15 enters a hole and that the checking member 16 does not, he knows instantly and then and there and without requiring any instrument or any measuring or other operation or any checker that the "GO" member has actually worn below allowable limits and must be replaced.

In many instances, the holes to be gauged is not sufficiently deep or for other reasons does not permit the checking member 16 to also enter the hole. In such instances, a measuring instrument or gauge can be set to either one of the checking members and the so set instrument can easily be applied to the "GO" member in the manner of measuring or calibrating operations to determine whether the "GO" member is still diametrically larger, or at least not smaller, than the checking member. The operator can easily do this setting of the instrument as well as the measuring while his cut is running or while he is not otherwise engaged fully.

With the arrangement shown, the member 16 can be used directly to check the size of the "GO" gauging member by the hole which is being gauged or indirectly by setting a measuring instrument to the size of the same and applying the instrument to the "GO" gauge member; and the member 13 can be used indirectly for the same purpose. The member 13 is smaller in diameter than the handle and is therefore free of wear and injury of any kind since the location thereof intermediate the ends of the handle protects the same while the member 16 is, naturally more exposed to wear and injury; therefore, the member 13 can be used to check the size of the member 16.

This double checking member arrangement also permits the use of a larger variety of easily available measuring instruments. For instance, if an adjustable ring gauge is available, the same can be adjusted onto the member 16 and moved outwardly; if it moves over the member 15, it shows that the same has worn down to or below the size of the member 16. A snap gauge or a micrometer or other similar measuring or calibrating instrument can be applied to the members 13 and 16 to check the size of one with the other and to check the member 15.

Since the difference in sizes between the gauging and checking members is very small, it is quite necessary to use delicate measuring instruments and since such instruments depend materially upon the feeling of the user of the same, it is quite desirable that at least one checking member is placed in such a position that the user of the instruments find no inconvenience in his feeling during the use of the same.

In my invention, the member 13 is placed substantially in the longitudinal middle of the device so that the same is balanced and a measuring instrument can be applied to the member 13 with more success of correct feeling than when the member 13 is placed in an unbalanced position.

The double checking members permit of one checking the other, one usable directly in the hole when possible, the other one protected against wear and injury, either one can be used for checking purposes, one placed in a position to facilitate the setting of a measuring instument, and the use of a variety of easily available measuring instruments so that an operator can check his gauge members easily and quickly and correctly and thereby not only save considerable time but also save expenses for measuring instruments.

Since different operators use such gauge devices and different operators have different habits of measuring, the double checking members are of further advantage in that different operators can use either one of the checking members as best suits their habit of measuring.

With the device described, a gaging member can be checked easily and conveniently and without loss of time and without requiring any checking operators and a gaging member can either check itself or be checked by the user of the gauge device; those gaging members which are subject to wear are renewable without sacrificing the entire gauge device; and the renewable gaging member and checking member are made of one piece of material to maintain the alignment thereof so that neither one of these members can become eccentric with the other.

I am aware that changes can be made in the arrangement or location of the elements as well as in the form shown and described; therefore, without limiting myself to the precise arrangement and form as shown and described,

I claim:—

1. A gauge device having a handle member, a NO GO gaging member at one end of said handle member, a GO gaging member at the other end of said handle member, and a checking member diametrically smaller than said GO gaging member on said handle member intermediate the ends thereof to facilitate calibration of said checking member.

2. A gauge device having a handle member, a NO GO gaging member at one end of said handle member, a GO gaging member at the other end of said handle member, a checking member diametrically smaller than said GO gaging member inwardly adjacent to said GO gaging member, and a checking member diametrically smaller than said GO gaging member on said handle member intermediate the ends thereof.

3. A gauge device having a handle and a gaging member on one end thereof and a diametrically reduced member on the other end thereof, a one piece element extendable over and removable from said reduced member and having a gaging portion and a checking portion smaller than said gaging portion by an amount equal to permissible wear of said gaging portion, and a checking portion on said handle and intermediate the ends thereof to facilitate calibration of the checking portion and of the same size as the first mentioned checking portion and diametrically smaller than said handle.

4. A gauge device having a handle member, a gaging member on an end of said handle member, a checking member for said gaging member inwardly adjacent to said gaging member, and a checking member for said gaging member located intermediate the ends of said handle member.

5. A gauge device having a handle and gaging members on the ends thereof and a checking member smaller than one of said gaging members by an amount equal to permissible wear of said one gaging member incorporated in and diametrically smaller than said handle member.

6. A gauge device having a handle member, a one piece renewable element on said handle member and having a gaging portion and a checking portion smaller than said gaging portion, and a checking member incorporated in said handle member intermediate the ends thereof and of the same size as said checking portion.

In testimony of the foregoing I affix my signature.

OTTIS R. BRINEY.